Figures 1, 2:
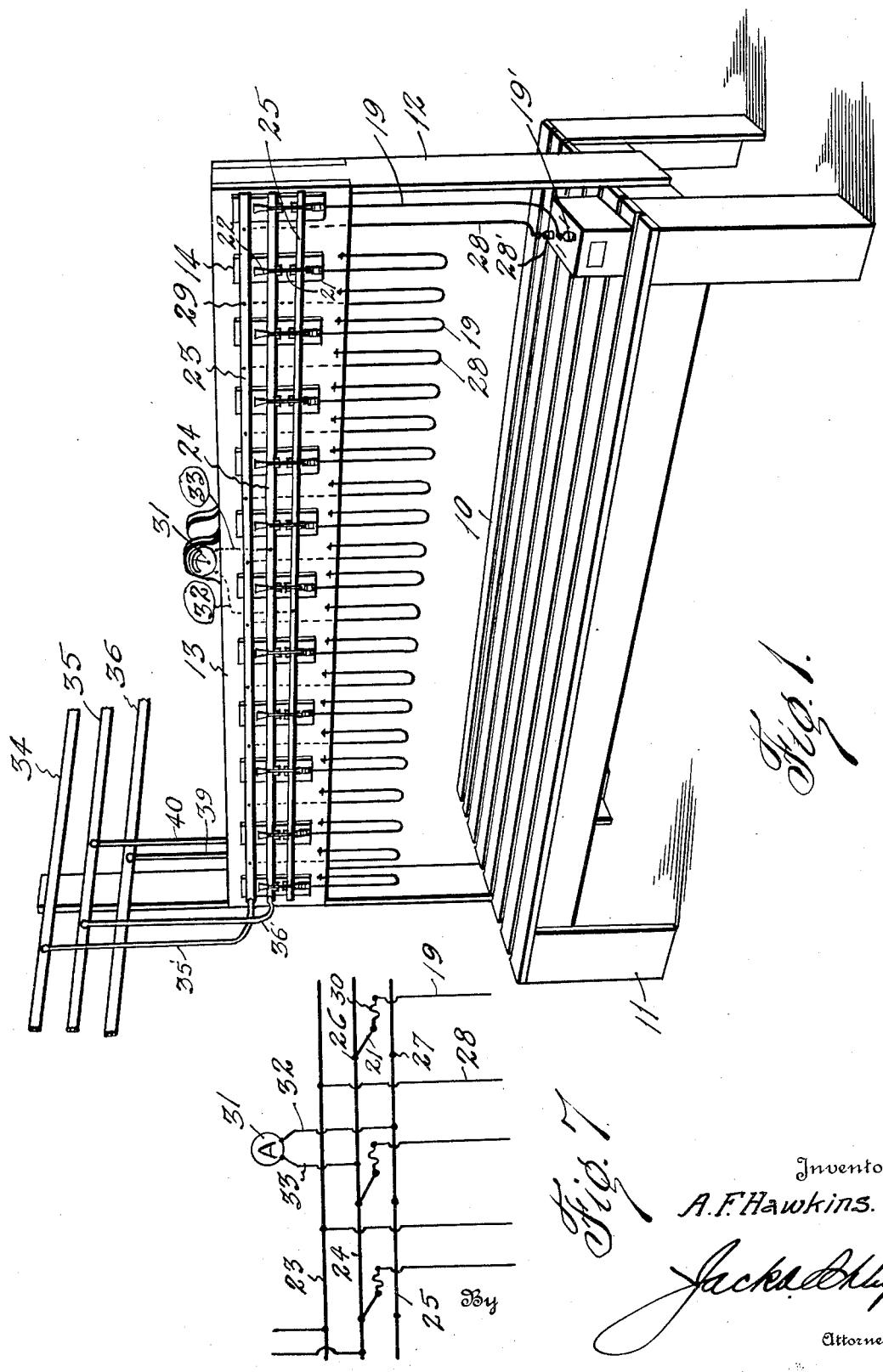

Nov. 2, 1926.

A. F. HAWKINS 1,605,345

STORAGE BATTERY CHARGING BENCH

Filed Nov. 3, 1922

3 Sheets-Sheet 1

Inventor
A. F. Hawkins.

By Jack A. Ohly.

Attorney

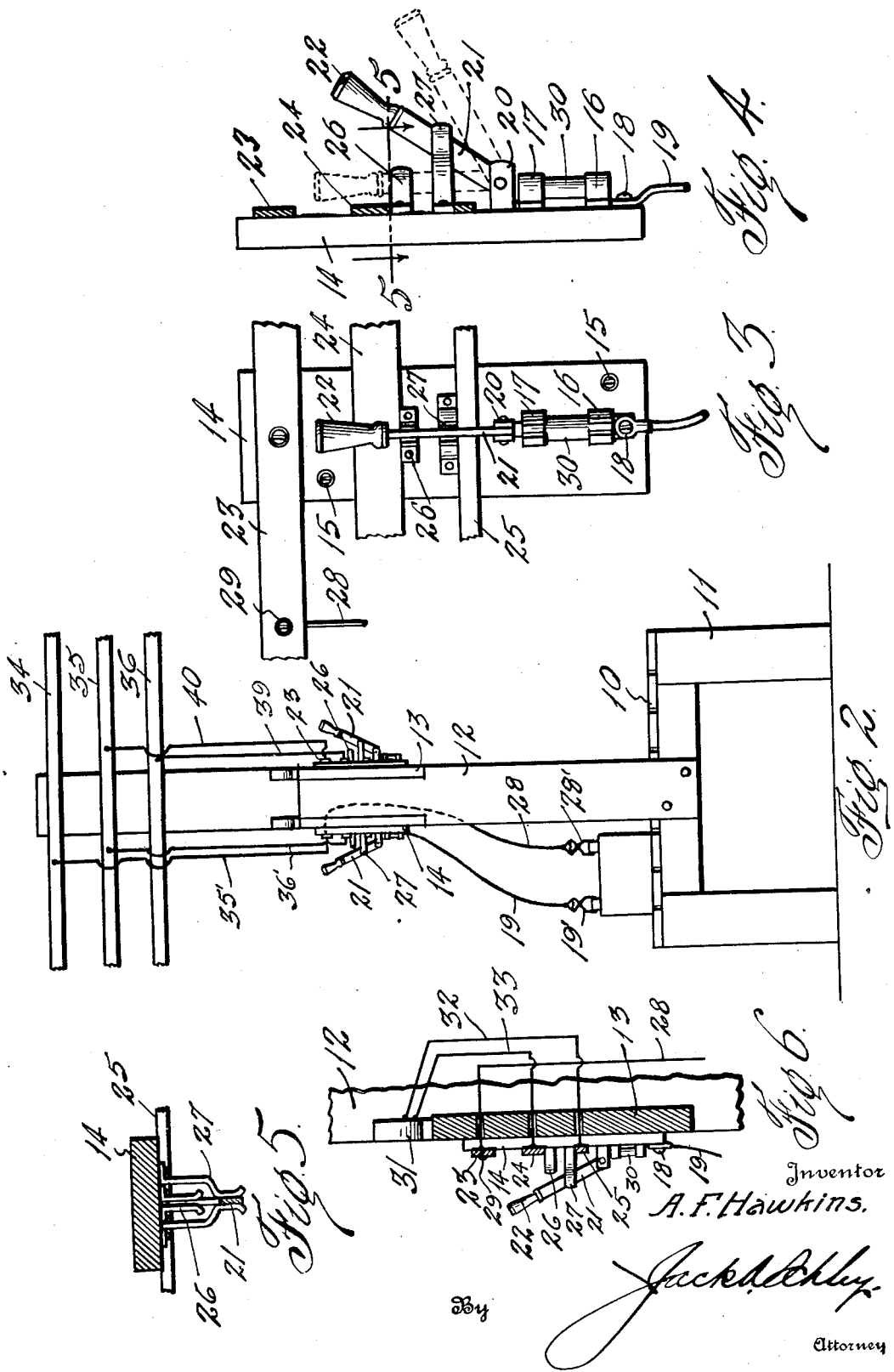

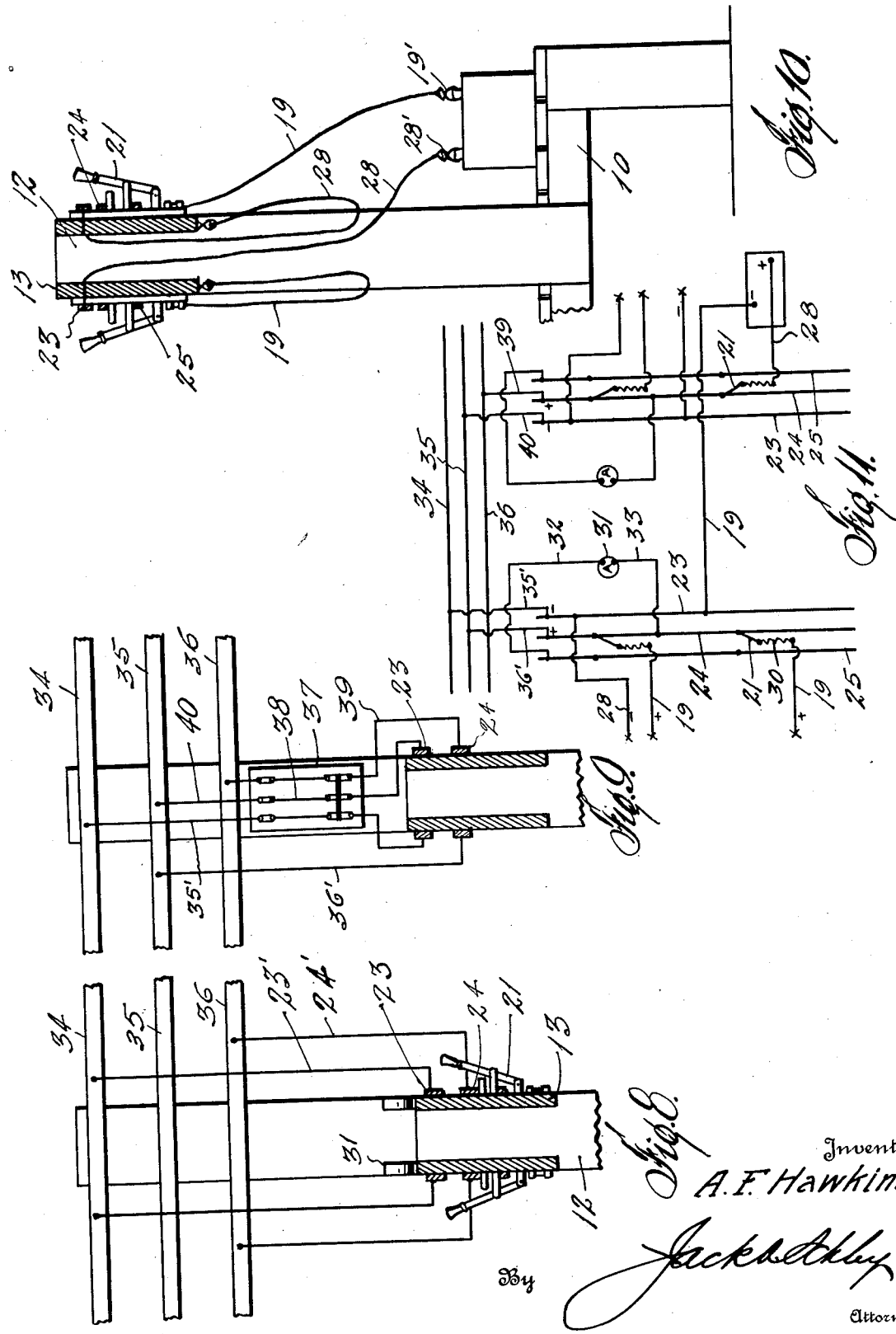

Patented Nov. 2, 1926.

1,605,345

UNITED STATES PATENT OFFICE.

ALDA F. HAWKINS, OF FORT WORTH, TEXAS.

STORAGE-BATTERY-CHARGING BENCH.

Application filed November 3, 1922. Serial No. 598,769.

This invention relates to new and useful improvements in storage battery charging benches.

This application is in part a continuation of my application filed October 8th, 1921, Serial Number 506,297.

The object of the invention is to provide a bench for supporting electric storage batteries which are to be charged by a multiple charging circuit.

A particular object of the invention is to provide such a bench with an elevated panel board on which the electrical current conductors and the battery charging leads may be mounted, together with the controlling switches, individual battery fuses and testing indicator.

Another object is to provide a panel board for the bench and to mount on said board all of the electrical conductors, connections and apparatus, whereby said board may be constructed as a unit with all mountings in place and shipped to its destination ready for installation.

A further object is to provide a bench with a common testing indicator and individual switches for the batteries connected in common with the indicator so that by closing the switch correlated with a particular battery, the latter may be tested in a convenient and expeditious manner.

A still further object is to provide a bench with battery connecting leads arranged in connection with fuses or the like, which prevent an operator from connecting the battery to the charging circuit with its poles reversed and also which would "blow" if a battery having a serious internal short circuit was connected.

Another object of the invention is to provide a bench having its electrical connections and apparatuses so arranged that by manipulating a single control switch the charging current may be cut into a particular battery on an ammeter reading taken at any time without disconnecting or disturbing the battery.

A further object of the invention is to provide a bench having panel boards for each side whereby 6 and 12 volt batteries may be charged on the same bench, One of the features of the invention resides in a bench having a battery supporting table provided at each end with uprights to which may be attached, a panel board on which all of the electrical charging equipment is mounted.

An important advantage of the invention is that the elevated panel board extending the length of the bench permits the mounting of electrical conductors, such as bus bars in a convenient manner, not only for connection with the controlling switches, but for connection with the electrical conductors supplying current to the bench.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a perspective view of a bench constructed in accordance with my invention, Fig. 2 is an end elevation of the same, Fig. 3 is an enlarged front detail of one of the controlling switches and its connections, Fig. 4 is a side elevation of the same, Fig. 5 is a cross-sectional view on the line 5—5 of Fig. 4, Fig. 6 is a sectional detail of the panel board, Fig. 7 is a circuit diagram, Fig. 8 is a sectional detail showing a bench connected for 12 volt batteries, Fig. 9 is a detail showing a three pole switch for disconnecting both panel boards of a bench, Fig. 10 is a partial end view showing the battery cable leads of opposite panel boards connected for charging a 12 volt battery, and Fig. 11 is a circuit diagram of the same.

In the drawings the numeral 10 designates a table or platform preferably formed of a plurality of longitudinal strips, spaced apart so as to give a circulation of air therethru, whereby fumes will be carried off, also to provide openings so that liquids spilled upon the table will rapidly drain thru the same. The table is supported at each corner by legs 11 or other suitable supports. At each end and preferably centrally of the table I provide uprights or posts 12 and to the upper portions of the posts I secure the ends of a panel board 13, which extends the length of the table. The panel board is disposed at a convenient height, which places its longitudinal central portion on about a line with the shoulders of the average operator. Boards may be placed on each side of the posts, but the invention contemplates also, a bench with a single panel board suitably supported above the same.

A description of one panel board will suffice for both. The length of the table 10 is calculated to accommodate a given number of storage batteries and the space reserved for each battery is referred to as a "station". Above each station is arranged on the board a vertical mounting plate 14 of slate or other insulating material. The board may be made of wood and the plate fastened thereto by wood screws 15 as is shown in Fig. 3.

Each plate constitutes the base of a control switch. On the lower portion of the base spaced fuse clips 16 and 17 are mounted in superposed order. The lower clip 16 has a terminal screw 18 to which is attached the upper end of a positive cable lead 19 having a clip 19' at its lower end, such as is commonly used for engaging the terminal of a storage battery.

A switch bracket 20 is mounted immediately above the clip 17 and has electrical connection therewith. A single switch blade 21 is pivoted in the bracket and has an insulating handle 22 at its upper end. Three bus bars 23, 24 and 25, respectively, are mounted longitudinally of the board and suitably fastened on the faces of the plates 14. The bar 23 is fastened at the top of each plate and is a negative bar. The positive bar 24 is below and has electrical connection at each plate with a spring keeper 26 forming one of the poles of the switch and adapted to be engaged by the blade 21.

The test bar 25 is below the bar 24 and has electrical connection at each plate with a keeper 27, which constitutes another pole of the switch. The keepers 27 are each U-shaped with contracted free ends as is shown in Fig. 5 and project outward beyond the keepers 26. In Fig. 4 the switch blade 21 is shown in its open position in dotted lines. When it is desired to close the charging circuit the blade is swung inward thru the keeper 27 to the keeper 26, which latter position is also shown in dotted lines. With the charging circuit closed it is only necessary to swing the blade outwardly a short distance to engage the keeper 27 and make a test. This switch serves the purpose of a double throw switch, but reduces the amplitude of the swing of the blade.

A negative cable lead 28 is fastened to a terminal screw 29 on the bar 23, thru a suitable opening in the board 13, whereby the lead hangs down the back of the board. The lead 28 has a terminal clip 28' at its lower end for engaging the negative pole of the battery. When the leads are not in use the clips may be engaged with the lower edge of the board 13 as is shown in Fig. 1. Fuses 30 are placed in the clips 16 and 17. An ammeter 31 is mounted on the upper central portion of each board and has connection with the test bar 25 at one terminal by means of a wire 32, while a second wire 33 extends from the opposite terminal of the ammeter to the bar 24. The test bar may be of less width than the other two bus bars, which are designed to carry the charging current with the greatest conductivity and the least resistance. Tracing the circuit through the ammeter with the switch in the test position shown in Fig. 4, the current passes from the positive pole of the generator through bus bar 36, switch and fuse connection 37, connecting line 39 to the switchboard bus bar 24 thence through the cable connection 33 to the ammeter 31 and from the opposite pole thereof through connection 32 to the test bar 25 and switch blade 21 to the battery drop 19 connected to the positive terminal of the battery. The current passes through the battery to its negative terminal 28' and by drop 28 to bus bar 23, thence to the connection 35' and neutral bar 35 returning to the negative pole of the generator.

In Fig. 1, the panel boards are shown connected with a three wire system including bus bars 34, 35 and 36. Such a system is desirable where it is desired to charge what are commnoly termed 6 volt and 12 volt batteries requiring 7½ volts and 15 volts respectively to charge. The bar 35 is neutral and a split voltage of 7½ volts is obtained by connecting with the bars 34 and 35 or with 35 and 36; a 15 volt current being had by connecting with the bars 34 and 36. One of the panel boards has its positive bar 24 connected with the bar 36 by a connector 36'; while the negative bar 23 is connected with bar 35 by a connector 35'. The other board is connected thru a connector 39 and a connector 40. It is to be understood, however, that a two line conductor may be used and the bus bars 23 and 24 connected thereto and a straight voltage used of either 7½ volts or 15 volts supplied.

In Fig. 9 I have shown a disconnecting switch 37 having three blades 38 and connecting poles. The poles of this switch are connected on the connectors 35', 39 and 40, respectively, while the connector 36' is not interrupted. By opening the switch both panel boards of a bench are disconnected. The switch may be omitted or other means may be used.

When a battery is to be charged it is placed on the bench at a vacant station. The switch blade 21 is in open position as is shown in the lower dotted position in Fig. 4. The clip 19' of the positive lead 19 is engaged with the positive terminal of the battery, while the clip 28' of the lead 28 is engaged with the negative terminal. The operator grasps the handle 22 of the switch blade 21 and swings the latter into contact with the keeper 27, to close the ammeter circuit from the battery over the test bar 25 and wire 32. This ammeter connection is made but for an instant, and if the hand went far beyond the normal range, a dead cell, internal short circuit or even reversed polarity of the battery connections, would be indicated. If the battery was connected to the leads with its poles reversed or had a serious short circuit, the fuse 30 would be burned out. However, a careful operator by quickly touching the keeper 27 and then swinging the blade away would obtain the reading or condition of the battery without burning out the fuse. After the test is made the blade may be left in engagement with the keeper 27 and from the reading of the ammeter 31, a rough estimate of the time required to charge the battery may be obtained.

After the ammeter reading is completed it is merely necessary to swing the blade 21 inward thru the keeper 27 into engagement with the keeper 26 to close the charging circuit, as is shown in dotted lines in Fig. 4. The movement of the blade from one keeper to the other is very short and saves much time. If at any time during the charging operation, a reading is desired, it is only necessary to pull the blade outwardly into engagement with the keeper 27.

Where it is desired to charge only 12 volt batteries on a bench the bus bars 23 and 24 of the panel boards thereof may be connected by connections 23' and 24', respectively, with the bars 34 and 36, respectively, as is shown in Fig. 8.

Fig. 11 is a diagram of the connection of the apparatus on the two opposite sides of a single bench. The two sides are symmetrical; one being connected between main conductor 24 and the neutral 35, and the other between the neutral 35 and the main conductor 36. 23 and 24 are the power busbars, and 25 the test busbar, with the ammeter 31 connected between it and the power busbar 24 leading to the neutral conductor 35. A series of battery leads 28 from the power busbar 23 leading to the neutral conductor 35 are connected to individual 6 volt batteries, with return leads 19 from the batteries to the respective fuses 30 and switches 21. These switches 21 are all diagrammatically represented in the position of connection with the other power busbar 24. In this position, in the upper left hand battery station for example, the current flows from the neutral conductor 35 to power busbar 24, switch 21, fuse 30, wire 19, the battery being charged, wire 28, power busbar 23, back to the main conductor 36. But if the switch 21 is thrown to the left, to connect with 25, the circuit is from main conductor 35, wire 24, wire 33, ammeter 31, wire 32, test busbar 25, switch 21, and through the battery as before; ammeter 31 will therefore indicate the charging current.

It has been found convenient to designate one of the panel boards on a bench having two boards, as a 6–12 volt board and to charge both six and 12 volt batteries on this side of the bench, thus eliminating a special board for 12 volt batteries. In Fig. 10 I have shown a 12 volt battery so connected and in Fig. 11 the circuit diagram for such a charging. By referring to Fig. 11 it will be seen that the positive cable lead from one panel board is connected with the positive pole of the battery, while the negative cable lead of the other board is connected with the negative pole of the battery. The cable leads selected are those connected with the bus bars 34 and 36 and the neutral bar 35 with its split voltage of 7½ volts is eliminated by connecting across the two busbars 34 and 36 of the branch circuits as is clearly shown in Fig. 11. This of course makes one of the positions on the bench idle and requires that the positive and negative leads not in use be clipped to the lower edges of the panel boards.

Batteries may be placed upon and removed from the bench without disturbing or disconnecting other batteries. The panel board may be entirely equipped at the factory and shipped ready for installation. All that will be required will be to fasten the ends of the board to the posts 12 with wood screws or the like. In fact the entire bench may be made in knock-down form and the table, legs and posts shipped ready to be assembled and the board mounted thereon. While the particular style of control switch and arrangement of conductors has been found advantageous the invention is not to be limited thereto.

The mounting of the insulating plates 14 on the wooden panel board 13 and then mounting the bus bars, 23, 24 and 25 on the plates, provides an effective, convenient and substantial manner of mounting said bars and insulating them from the board and the switches. A device of this nature permits of many variations and modifications, such as the use of circuit breakers instead of the fuses 30 or cables instead of the bus bars, and numerous other substitutions, such as come within the scope of the appended claims.

What I claim, is:

1. In a battery charging bench, a support adapted to receive a plurality of batteries, a panel above the support, a plurality of power bars and a single test bar extending longitudinally of the panel, a switch on said panel for each battery and having two selectable contact terminals, one connected to one power bar and the other to said test bar, a battery lead from said switch, a battery lead from a second power bar, and an ammeter connected to the test bar and one power bar.

2. As a sub-combination, a panel board for a battery charging bench, said board having current conductors extending longitudinally thereof, two of said conductors being for supplying a charging current and one of said conductors being for a testing connection, an ammeter mounted on the board and connected with the test conductor and one of the current conductors, a plurality of individual control switches, each having one pole connected with the test strip and another pole connected with one of the current conductors, and individual pairs of battery connecting leads, one lead of each pair being connected with a switch and the other lead being connected with the other current conductor.

3. In a bench for charging storage batteries in multiple, a table, a panel board supported over the table and extending the length thereof, means for supporting the board over the table, a series of insulating plates mounted on the face of the board, positive and negative bus bars extending the length of the board and mounted on the plates in spaced order, a test bus bar extending the length of the board and mounted on the plates in spaced relation to the other bars, an ammeter mounted on the board and having circuit connection with the positive and test bars, a circuit closing means on each plate arranged to connect with the test bar or the positive bar, and a plurality of battery leads arranged in pairs, one lead of each pair being connected with the negative bar and the other lead of each pair being connected with one of the circuit closing means.

4. In a bench for charging storage batteries in multiple, a table, a panel board supported over the table and extending the length thereof, means for supporting the board over the table, a series of insulating plates mounted on the face of the board, positive and negative bus bars extending the length of the board and mounted on the plates in spaced order, a test bus bar extending the length of the board and mounted on the plates in spaced relation to the other bars, an ammeter mounted on the board and having circuit connection with the positive and test bars, a single switch blade hinged on each plate, a fuse connected with each blade, a battery lead connected with each fuse, other battery leads connected with the negative bar, a switch pole on each plate connected with the positive bar, and a second switch pole on each plate connected with the test bar.

5. In a bench for charging electric storage batteries in multiple, the combination with a three wire current supply circuit, of a table, a pair of panel boards mounted longitudinally of the table, whereby battery charging stations are provided on each side of the table below said boards, positive and negative battery connecting cables attached to each board, one cable on each board being connected with the neutral wire of the supply circuit and the remaining cable of each board being connected respectively with the opposite side of said circuit, whereby batteries of a given voltage may be connected to leads of a single board and batteries of a higher voltage may be connected across the boards by attaching thereto the positive lead of one board and the negative lead of the other board and dead ending the cable leads connected with the neutral wire.

6. In a storage battery charging bench, a table having stations for a plurality of batteries, a panel board supported above the bench, two power and one test busbars extending longitudinally of the panel board, a switch on said panel board opposite each station, two selectable contact terminals in said switch, one of said terminals connected to one of said power busbars, the other terminal connected to said test busbar, a pair of battery leads, the blade of said switch connected to one battery lead, the other battery lead connected to the other power busbar, and an ammeter connected between said test busbar and said first power busbar.

In testimony whereof I affix my signature.

ALDA F. HAWKINS.